(12) United States Patent
Hao et al.

(10) Patent No.: US 9,678,353 B2
(45) Date of Patent: Jun. 13, 2017

(54) THREE-DIMENSIONAL GLASSES AND THREE-DIMENSIONAL DISPLAY SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Yutao Hao, Beijing (CN); Feng Zhao, Beijing (CN); Bin Zou, Beijing (CN); Qian Zhang, Beijing (CN); Junjie Guo, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 278 days.

(21) Appl. No.: 14/388,617

(22) PCT Filed: Mar. 21, 2014

(86) PCT No.: PCT/CN2014/073854
§ 371 (c)(1),
(2) Date: Sep. 26, 2014

(87) PCT Pub. No.: WO2015/043142
PCT Pub. Date: Apr. 2, 2015

(65) Prior Publication Data
US 2016/0252741 A1  Sep. 1, 2016

(30) Foreign Application Priority Data

Sep. 30, 2013  (CN) .......................... 2013 1 0460201

(51) Int. Cl.
*G02B 27/26*  (2006.01)
*G02B 5/30*  (2006.01)
(Continued)

(52) U.S. Cl.
CPC ............... *G02B 27/26* (2013.01); *G02B 5/30* (2013.01); *G02B 27/0172* (2013.01);
(Continued)

(58) Field of Classification Search
CPC ............... G02B 27/0172; G02B 27/26; G02B 2027/0134; G02B 2027/0154;
(Continued)

(56) References Cited

U.S. PATENT DOCUMENTS 5,876,085 A * 3/1999 Hill ..................... B60N 2/542
296/65.02
6,242,065 B1 * 6/2001 Blomberg .......... B29D 11/0073
351/159.01
2007/0210046 A1 * 9/2007 Lai ..................... B23K 26/0869
219/121.78

FOREIGN PATENT DOCUMENTS

CN  86100496  11/1987
CN  101144914 A * 3/2008 ............. G02B 27/28
(Continued)

OTHER PUBLICATIONS

International Search Report and Written Opinion issued in corresponding International Application No. PCT/CN2014/073854 dated Jun. 13, 2014.
(Continued)

*Primary Examiner* — Scott J Sugarman
*Assistant Examiner* — Balram Parbadia
(74) *Attorney, Agent, or Firm* — Brooks Kushman P.C.

(57) ABSTRACT

The present disclosure discloses three-dimensional glasses and a three-dimensional display system, which provide a wearer with a better three-dimensional visual effect and reduce dizziness and fatigue of the wearer. The three-dimensional glasses include a frame including two lens frames, each lens frame having an engagement part; two
(Continued)

lenses rotationally assembled in the engagement parts of the two lens frames, respectively; and at least one counterweight member fixed to a periphery of each of the lenses and rotating the lens to an equilibrium position. When the two lenses are at the equilibrium positions, a transmission axis of one of the two lenses is parallel to a polarization axis of a left eye image of a three-dimensional display apparatus and a transmission axis of the other one of the two lenses is parallel to a polarization axis of a right eye image of the three-dimensional display apparatus.

12 Claims, 2 Drawing Sheets

(51) Int. Cl.
    *G02B 27/22*     (2006.01)
    *G02B 27/01*     (2006.01)
(52) U.S. Cl.
    CPC .. *G02B 27/2264* (2013.01); *G02B 2027/0134* (2013.01); *G02B 2027/0152* (2013.01); *G02B 2027/0154* (2013.01); *G02B 2027/0178* (2013.01)
(58) Field of Classification Search
    CPC ........ G02B 2027/0178; G02B 27/2221; G02B 5/30; G02B 27/017; G02B 27/2228; H04N 13/0438; H04N 2213/008; H04N 13/0007; H04N 13/004; H04N 13/026; G02C 5/001; G02C 7/00; G02C 7/12
    See application file for complete search history.

(56) References Cited

FOREIGN PATENT DOCUMENTS

| | | | | |
|---|---|---|---|---|
| CN | 102608769 | | 7/2012 | |
| CN | 102608769 A | * | 7/2012 | ............ G02B 27/26 |
| CN | 102654678 | | 9/2012 | |
| CN | 103533328 | | 1/2014 | |
| KR | 20110037292 A | * | 4/2011 | ............ G02B 27/22 |
| KR | 20110124396 | | 11/2011 | |
| KR | 20120049703 | | 5/2012 | |
| WO | 2011058784 | | 5/2011 | |

OTHER PUBLICATIONS

Text of the Notification of the First Office Action, App. No. 2013104602015, Jan. 7, 2015.

* cited by examiner

THREE-DIMENSIONAL GLASSES AND THREE-DIMENSIONAL DISPLAY SYSTEM

CROSS-REFERENCE TO RELATED APPLICATION

This application is the U.S. national phase of PCT Application No. PCT/CN2014/073854 filed on Mar. 21, 2014, which claims priority to Chinese Patent Application No. 201310460201.5 filed on Sep. 30, 2013, the disclosures of which are incorporated in their entirety by reference herein.

TECHNICAL FIELD

The present disclosure relates to the field of three-dimensional display technology, in particular to three-dimensional glasses and a three-dimensional display system.

BACKGROUND

Three-dimensional display has been considered as an ultimate dream of display technology development, many companies and research institutions have been dedicated to research in this field over the years. Developed countries such as Japan, Europe, America, South Korea and other regions have been involved in research on the three-dimensional display technology in early 1980s, and began to gradually acquire different levels of research results in the 1990s, and have developed two types of three-dimensional display technology systems including one system that requires wearing three-dimensional glasses and the other system that does not require wearing the three-dimensional glasses.

The three-dimensional display technology system that requires wearing the three-dimensional glasses may be divided into an early anaglyph-type three-dimensional display technology, nowadays shutter-type three-dimensional display technology, and nowadays polarization-type three-dimensional display technology. For the shutter-type and the polarization-type three-dimensional display technologies that are widely used nowadays, a wearer is required to wear corresponding three-dimensional glasses. For any type of three-dimensional glasses, the wearer needs to correctly wear the glasses and maintain a correct head posture when watching, so that a transmission axis of each lens is properly angled with a polarization axis of an image of a display device.

Specifically, the polarization-type three-dimensional display technology utilizes polarization properties of light. A three-dimensional display apparatus alternately displays polarized lights that have polarization directions perpendicular to each other based on left and right eye images. When the left eye image is displayed, a transmission axis direction of the left lens is parallel to a polarization axis of the left eye image and the left eye image is visible to the left eye. At this time, a transmission axis direction of the right lens is perpendicular to the polarization axis of the left eye image and the left eye image is invisible to the right eye. When the right eye image is displayed, the situation is exactly opposite to above-described situation.

For the shutter-type three-dimensional display technology, a three-dimensional display apparatus divides each image frame into two parts to form two groups of images respectively corresponding to the left eye and the right eye, and alternately display the two groups of images in the same polarization direction in a continuous manner. At the same time, an infrared signal transmitter equipped to the three-dimensional display apparatus synchronously controls switches of corresponding left and right shutter-type lenses of the three-dimensional glasses. The shutter-type lens usually utilizes a principle that liquid crystal molecules are rearranged when an electric voltage is applied so as to change a transparency of a liquid crystal panel, so that each of the left eye and the right eye may see a corresponding image at a correct moment. In fact, the left and right shutter-type lenses of the shutter-type three-dimensional glasses are polarized lenses, and a transmission axis of the left lens is the same with a transmission axis of the right lens. Under a correct viewing posture, the transmission axes of the left and right lenses are parallel to a polarized axis of a polarized light emitted from the corresponding three-dimensional display apparatus.

According to above-described two types of three-dimensional display technologies, the two eyes of the wearer view different images that switch in a high speed, which causes an illusion in the brain of the wearer so that three-dimensional images are viewed.

However, the above-described prior art has following disadvantages: the wearer needs to maintain correct head posture when viewing the images; when the glasses rotate by an angle as the head swings towards the left or right, the transmission axes of the lenses fail to maintain proper angles with the polarized axes of images of the display apparatus. Thus, the wearer cannot get good viewing effect and may feel dizzy and fatigued.

SUMMARY

The present disclosure provides three-dimensional glasses and a three-dimensional display system, which may provide a wearer with a good viewing effect and reduce dizziness and fatigue of the wearer.

According to one embodiment of the present disclosure, three-dimensional glasses are provided and include:

a frame including two lens frames, each of the two lens frames including an engagement part;

two lenses rotationally assembled in the engagement parts of the two lens frames, respectively; at least one counterweight member fixed to a periphery of each of the two lenses and rotating each of the two lenses to an equilibrium position. When the two lenses are at the respective equilibrium positions, a transmission axis of one of the two lenses is parallel to a polarization axis of a left eye image of a three-dimensional display apparatus and a transmission axis of the other one of the two lenses is parallel to a polarization axis of a right eye image of the three-dimensional display apparatus.

According to above-described embodiment of the present disclosure, when a wearer's head swings towards the left or right, each of the two lenses rotates to the equilibrium position under action of the at least one corresponding counterweight member. That is, each of the lenses rotates to the equilibrium position where a gravity center of the at least one counterweight member and a gravity center of the lens are located in a same vertical line but not overlap with each other. At the equilibrium position, the transmission axis of one of the two lenses is parallel to the polarization axis of the left eye image of the three-dimensional display apparatus and the transmission axis of the other one of the two lenses is parallel to the polarization axis of the right eye image of the three-dimensional display apparatus. Such a mechanical structure may make the transmission axis of each lens maintained at a proper angle with the polarization axis of images of the display apparatus. Thus, this may provide a better three-dimensional visual effect to the wearer and reduce dizziness and fatigue of the wearer.

Optionally, the engagement part includes a sliding rail or a sliding slot in an inner side of each of the two lens frames.

Optionally, with respect to each of the two lenses, there are at least two counterweight members. A part or all part of the counterweight members include a sliding member which is rotationally engaged with the sliding rail or the sliding slot. Each of the two lenses is rotationally assembled to the sliding rail or the sliding slot of the corresponding lens frame through at least two sliding members. Optionally, the sliding member includes a sliding block.

Optionally, with respect to each of the two lenses, there are at least two counterweight members. A part or all part of the counterweight members include a rolling member seat fixed to a periphery of the lens and a rolling member which is rotationally disposed in the rolling member seat and is rollably engaged with the sliding rail or the sliding slot. Each of the two lenses is rotationally assembled to the sliding rail or the sliding slot of the corresponding lens frame through at least two rolling members. Optionally, the rolling member includes a roll ball, a roller, or a roller pin. The above-described configurations may realize a rotation of the lens relative to the lens frame. Especially, when the lens is rotationally assembled to the sliding rail or the sliding slot through the rolling members, the friction between the lens and the sliding rail or the sliding slot is relatively low. Thus, the rotation is stable and reliable.

Optionally, with respect to each of the two lenses, an assembly of the lens and the counterweight member has a lowest gravity center at the equilibrium position compared with at other positions. Further, optionally, with respect to each of the two lenses, at the equilibrium position, a gravity center of the counterweight member and a gravity center of the lens are located in a same vertical line but not overlapped with each other, and a distance from the gravity center of the counterweight member to the gravity center of the lens is shorter than a radius of the lens. Such a solution may make the rotation of the lens relative to the lens frame more stable.

Optionally, with respect to each of the two lenses, there are three counterweight members. Among the three counterweight members, a first counterweight member has the heaviest weight, and a second counterweight member has a weight equal to a weight of a third counterweight member. The second counterweight member and the third counterweight member are symmetrically disposed on two different sides of the first counterweight member. Further, optionally, with respect to each of the two lenses, the three counterweight members are uniformly disposed on the periphery of the lens. When the lens rotates to the equilibrium position, the first counterweight member is located below a gravity center of the lens. The second counterweight member and the third counterweight member are symmetrically distributed on two sides of the first counterweight member. Such a configuration makes the rotation of the lens relative to the lens frame more stable.

Optionally, the lens has a circular shape or a regular polygonal shape. Optionally, the lens frame has a circular shape or an ellipse shape. The above embodiments may provide a better visual effect.

Optionally, the lens frame has an ellipse shape, with respect to each of the two lenses, a sliding slot or a sliding rail is disposed around a circumference of the lens and rotationally engaged with the sliding slot or the sliding rail. The counterweight member is fixed to a surface of the lens close to the circumference or is embedded inside the lens at a position close to the circumference of the lens.

Optionally, the lens is a polarization-type lens or a shutter-type lens. No matter what form of lens is selected, the transmission axis of the lens and the polarization axis of the display apparatus image may be maintained at a proper angle with respect to each other, so that the wearer may get a better three-dimensional visual effect.

One embodiment of the present disclosure also provides a three-dimensional display system, which includes the three-dimensional glasses according to any one of above-described technical solutions, which may provide the wearer with a better three-dimensional visual effect and reduce dizziness and fatigue of the wearer.

DETAILED DESCRIPTION

To make objects, technical solutions and advantages of the present disclosure more clear, the present disclosure will be described in detail with reference to embodiments of the present disclosure.

In the present disclosure, the term "polarization axis", which is also referred to as "polarized light polarization axis", refers to a polarization direction of a polarized light which has passed through a polarizer. The term "transmission axis" refers to a vibration direction of a light allowed to pass through a polarizer (lens), which is also referred to as "transmission axis of the polarizer".

In order to provide a better three-dimensional viewing effect to a wearer and reduce dizziness and fatigue of the wearer, one embodiment of the present disclosure provides three-dimensional glasses and a three-dimensional display system. When the wearer's head swings towards the left or right, each of the two lenses rotates to an equilibrium position under action of at least one corresponding counterweight member. At the equilibrium positions, a transmission axis of one of the lenses is parallel to a polarization axis of a left eye image of a three-dimensional display apparatus; and a transmission axis of the other one of the lenses is parallel to a polarization axis of a right eye image of the three-dimensional display apparatus. Such a mechanical structure makes the transmission axis of each of the two lenses maintained at a proper angle with the polarization axis of images of the display apparatus all the time. Thus, this may provide the wearer with a better three-dimensional viewing effect and reduce dizziness and fatigue of the wearer.

Figure 1:
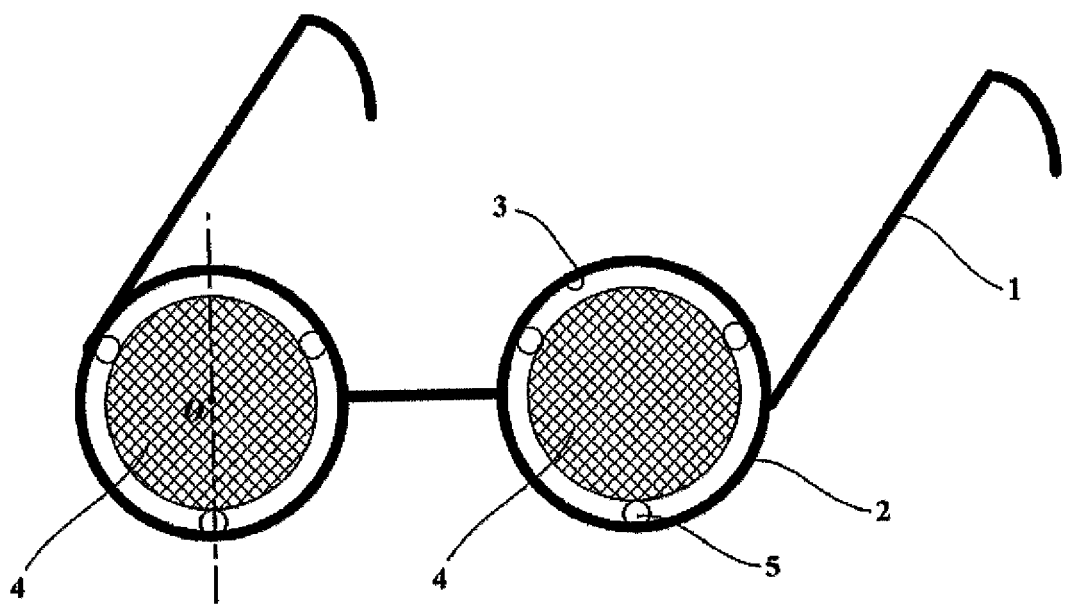
FIG. 1 is a diagram showing a structure of three-dimensional glasses according to one embodiment of the present disclosure.

As shown in FIG. 1, one embodiment of the present disclosure provides three-dimensional glasses. The three-dimensional glasses include a frame 1 and two circular lenses 4. The frame 1 includes two lens frames 2 for holding the lenses, legs and a connection portion connecting the two lens frames. Each of the lens frames 2 has a sliding slot 3 disposed in an inner side of the lens frame 2.

The two lenses 4 may be rotationally assembled in the sliding slots 3 of the lens frames 2, respectively. At least one counterweight member 5 is fixed on a periphery portion of each of the lenses 4 and rotates each of the lenses 4 to the equilibrium position. When the two lenses 4 are at the equilibrium positions, the transmission axis of one of the lenses 4 is parallel to the polarization axis of the left eye image of the three-dimensional display apparatus and the transmission axis of the other one of the lenses 4 is parallel to the polarization axis of the right eye image of the three-dimensional display apparatus.

Figure 2:
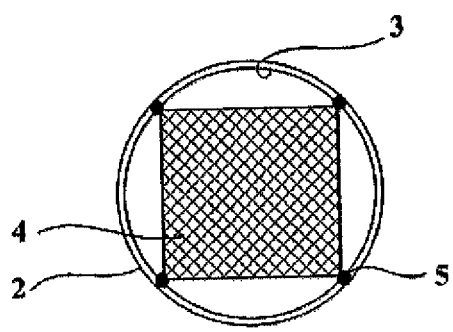
FIG. 2 is a diagram showing an assembly structure of a lens and a lens frame of three-dimensional glasses according to one exemplary embodiment.

The equilibrium position is a position where each of the lenses 4 stops rotating relative to the sliding slot 3. An assembly of the lens 4 and the counterweight member 5 has the lowest gravity center at the equilibrium position compared with at other positions, and is in a steady state, and the transmission axis of the lens 4 and the polarization axis of images of the display apparatus are maintained at a proper angle with respect to each other. Shapes of the lens frame 2 and the lens 4 are not limited, as long as the lens 4 may be assembled in the sliding slot 3 of the lens frame 2 and may rotate relative to the sliding slot 3. Optionally, the lens 4 may have a circular shape or a regular polygonal shape, and the lens frame 2 may have a circular shape, which provides a better visual effect. Also as shown in FIG. 2, the lens frame 2 may have a circular shape and the lens 4 may have a square shape, the counterweight members 5 may be disposed at vertexes of the square lens 4, and the lens 4 may be rotationally assembled in the sliding slot 3 of the lens frame 2.

In one embodiment of the present disclosure, the lens 4 may be a polarization-type lens or a shutter-type lens.

In the three-dimensional glasses according to the foregoing embodiments, no matter what form of lens is selected, the transmission axis of the lens and the polarization axis of images of the display apparatus may be maintained at a proper angle with respect to each other so that the wearer may get a better three-dimensional visual effect.

In the foregoing embodiments of the present disclosure, when the three-dimensional glasses are polarization-type three-dimensional glasses and the wearer's head swings to the left or right, each of the two lenses 4 rotates to the equilibrium position under action of the at least one corresponding counterweight member 5. Optionally, each of the two lenses 4 rotates to the equilibrium position where a gravity center of the at least one counterweight member 5 and a gravity center of the lens 4 are located in a same vertical line but do not overlap with each other. At the equilibrium positions, the transmission axis of one of the lenses 4 is parallel to the polarization axis of the left eye image of the three-dimensional display apparatus and the transmission axis of the other one of the lenses 4 is parallel to the polarization axis of the right eye image of the three-dimensional display apparatus. That is, such a mechanical structure makes the transmission axis of each of the lenses 4 maintained at a proper angle with the polarization axis of the images of the display apparatus. Thus, a better three-dimensional visual effect may be provided to the wearer, and dizziness and fatigue of the wearer may be reduced.

In the foregoing embodiments of the present disclosure, when the three-dimensional glasses are shutter-type three-dimensional glasses and the wear's head swings towards the left or right, each of the two lenses 4 rotates to the equilibrium position under action of the at least one corresponding counterweight member 5. That is, each of the two lenses 4 rotates to the equilibrium position where the gravity center of the at least one counterweight member 5 and the gravity center of the lens 4 are located in a same vertical line but do not overlap with each other. At the equilibrium positions, the transmission axis of one of the lenses 4 is parallel to the polarization axis of the left eye image of the three-dimensional display apparatus and the transmission axis of the other one of the lenses 4 is parallel to the polarization axis of the right eye image of the three-dimensional display apparatus. For the shutter-type three-dimensional display technology, since the polarization axis of the left eye image of the three-dimensional display apparatus is the same as the polarization axis of the right eye image of the three-dimensional display apparatus, thus, for the shutter-type three-dimensional glasses, at the equilibrium positions, both the transmission axes of the left and right lens 4 are parallel to the polarization axis of the images of the three-dimensional display apparatus. That is, such a mechanical structure makes the transmission axis of each of the lenses 4 maintained at a proper angle with the polarization axis of the images of the display apparatus. Thus, a better three-dimensional visual effect may be provided to the wearer, and dizziness and fatigue of the wearer may be reduced.

A quantity of the counterweight members 5 is not limited. For example, the quantity of the counterweight members 5 may be one, two, three or the like, as long as positions of the various counterweight members 5 enable the lens 4 to satisfy optical requirements (that is, a transmission axis is parallel to the polarization axis of the left eye image or the right eye image) at the equilibrium position. Optionally, as shown in FIG. 1, the quantity of the counterweight members 5 are three. Among the three counterweight members 5, a first counterweight member has the heaviest weight, and a second counterweight member has a weight equal to a weight of a third counterweight member. The second counterweight member and the third counterweight member are symmetrically disposed on two sides of the first counterweight at the periphery portion of the lens 4. When the lens 4 is at the equilibrium position, the first counterweight member is located below a gravity center O of the lens 4. Optionally, the three counterweight members 5 are uniformly distributed at the periphery portion of the lens 4 so that a distance from a gravity center of the three counterweight members 5 to the gravity center of the lens 4 is shorter than a radius of the lens 4, which may make the rotation of the lens 4 relative to the lens frame 2 more stable.

Figure 3:
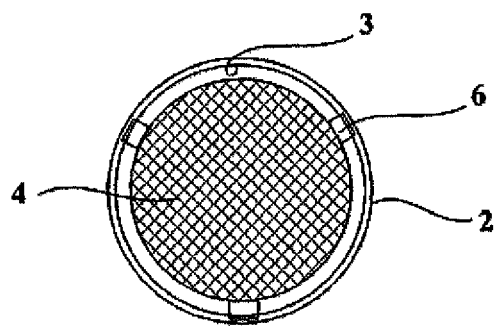
FIG. 3 is a diagram showing an assembly structure of a lens and a lens frame of three-dimensional glasses according to another exemplary embodiment.

The form in which the lens 4 is rotationally assembled to the sliding slot 3 is not limited. As another embodiment shown in FIG. 3, the quantity of the counterweight members 5 is at least two for each lens 4, and the counterweight members are sliding members 6 which are slidably engaged with the sliding slot 3. As shown in FIG. 3, the sliding members 6 are three sliding blocks. The lens 4 is rotationally assembled in the sliding slot 3 of the corresponding lens frame 2 through at least two sliding members 6. In such a configuration, at least two sliding members 6 are slidably engaged with the sliding slot 3 so that the lens 4 may rotate relative to the sliding slot 3; as counterweight members, the at least two sliding members 6 may maintain the lens 4 at the equilibrium position.

Figure 4:
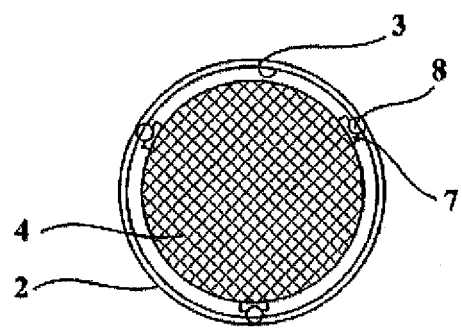
FIG. 4 is a diagram showing an assembly structure of a lens and a lens frame of three-dimensional glasses according to another exemplary embodiment.

As another embodiment shown in FIG. 4, for each lens 4, the quantity of counterweight members 5 is at least two (FIG. 4 shows three counterweight members). The counterweight member includes a rolling member seat 7 fixed to the periphery portion of the lens 4 and a rolling member 8 which is rotationally disposed in the rolling member seat 7 and is rollably engaged with the sliding slot 3. The lens 4 is rotationally assembled in the sliding slot 3 of the corresponding lens frame 2 through at least two rolling members 8. The rolling member 8 may be a roll ball, a roller, or a roller pin, etc., and may be selected according to needs and is not specifically limited here. In the present embodiment, at least two rolling members 8 are rollably engaged with the sliding slot 3 so that the lens 4 may rotate relative to the sliding slot 3; the rolling member seat 7 and the rolling member 8 disposed in the rolling member seat 7 as a whole are used as a counterweight member, and at least two counterweight members may make the lens 4 maintained at the equilibrium position. In the present embodiment, the rolling member 8 is rollably engaged with the sliding slot 3 with a low friction, and this makes the rotation of the lens 4 relative to the sliding slot 3 more stable and reliable.

It is worth to mention that, in other embodiments of the present disclosure, the lens 4 may be rotationally assembled in the sliding slot 3 of the lens frame 2 through other structural forms, and the counterweight member 5 may be merely used for adjusting the lens 4 to the equilibrium position. The counterweight member 5 may be disposed at the periphery portion of the lens 4, or may be disposed at a portion close to the periphery portion of the lens 4. For example, two sliding blocks having the same weight may be fixed to a circumference of the lens and each sliding block may be slidably engaged with the sliding slot, and several other counterweight members may be further fixed to the circumference of the lens to adjust the lens to the equilibrium position.

Figure 5:
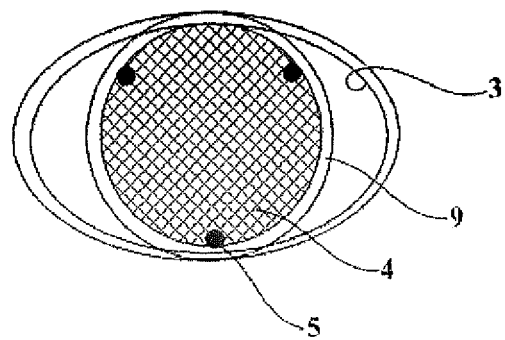
FIG. 5 is a diagram showing an assembly structure of a lens and a lens frame of a three-dimensional glass according to another exemplary embodiment.

As another embodiment shown in FIG. 5, the lens frame 2 may have an ellipse shape; a sliding rail 9 is disposed around the circumference of the lens 4 and slidably engaged with the sliding slot 3. The counterweight member 5 is fixed to a surface of the lens 4 close to the circumference of the lens 4, or is embedded inside the lens 4 at a portion close to the circumference of the lens 4 (it is better to not block a line of sight).

Moreover, the quantity, weight, specific structures, distributed positions of the counterweight members 5 may be specifically selected by a person skilled in the art according to a weight, a size, a shape of the lens, so long as each of the two lenses rotates to the equilibrium position under action of the at least one corresponding counterweight member when the wearer's head swings towards the left or right.

The foregoing embodiments may be appropriately modified. For example, the sliding slot 3 of the lens frame 2 may be replaced with a sliding rail, and a sliding member or a sliding slot which slidably or rotationally engage with the sliding rail may be provided to the lens.

The above-described solutions may automatically adjust the lens to the equilibrium position so that the wearer may get a better three-dimensional visual effect.

One embodiment of the present disclosure also provides a three-dimensional display system including the three-dimensional glasses according to any one of the foregoing embodiments. The three-dimensional display system may be a polarization-type three-dimensional display system (which needs to be used in conjunction with polarization-type three-dimensional glasses), or may be a shutter-type three-dimensional display system (which needs to be used in conjunction with shutter-type three-dimensional glasses), which may provide the wearer with a better three-dimensional visual effect and reduce dizziness and fatigue of the wearer.

Obviously, one person skilled in the art may make various modifications and variations without departing from a spirit and a scope of the present disclosure. Thus, when such modifications and variations belong to the claims and equivalent technical scope of the present disclosure, the present disclosure also intends to include such variations and modifications.

What is claimed is:

1. Three-dimensional glasses comprising:
    a frame including a first lens frame and a second lens frame
    a first lens rotationally retained within the first lens frame;
    a second lens rotationally retained within the second lens frame;
    at least two first counterweight members retained between the first lens and the first lens frame; and
    at least two second counterweight members retained between the second lens and the second lens frame;
    wherein the first lens frame comprises a first sliding rail in an inner surface of the first lens frame; and the second lens frame comprises a second sliding rail in an inner surface of the second lens frame;
    wherein each of the first counterweight members only comprises a first rolling member seat and a first rolling member; the first rolling member seat is at the first lens, and the first rolling member is rotationally retained between the first rolling member seat and the first sliding rail;
    wherein each of the second counterweight members only comprises a second rolling member seat and a second rolling member; the second rolling member seat is at the second lens, and the second rolling member is rotationally retained between the second rolling member seat and the second sliding rail.

2. The three-dimensional glasses according to claim 1, wherein the first counterweight members are between an outer circumferential surface of the first lens and the inner surface of the first lens frame; and
    the second counterweight members are between an outer circumferential surface of the second lens and the inner surface of the second lens frame.

3. The three-dimensional glasses according to claim 2, wherein the first counterweight members are spaced from each other; and
    the second counterweight members are spaced from each other.

4. The three-dimensional glasses according to claim 2, wherein the first rolling member seats are spaced from each other; and
    the second rolling member seats are spaced from each other.

5. The three-dimensional glasses according to claim 1, wherein the first rolling member comprises a roll ball, a roller, or a roller pin; and the second rolling member comprises a roll ball, a roller, or a roller pin.

6. The three-dimensional glasses according to claim 1, wherein the first rolling member seat is fixed at the first lens; and the second rolling member seat is fixed at the second lens.

7. A three-dimensional display system, comprising three-dimensional glasses according to claim 1.

8. Three-dimensional glasses comprising:
    a frame including a first lens frame and a second lens frame
    a first lens rotationally retained within the first lens frame;
    a second lens rotationally retained within the second lens frame;

at least two first counterweight members retained between the first lens and the first lens frame; and at least two second counterweight members retained between the second lens and the second lens frame;

wherein the first lens frame comprises a first sliding rail in an inner surface of the first lens frame; and the second lens frame comprises a second sliding rail in an inner surface of the second lens frame;

wherein each of the first counterweight members comprises a first rolling member seat and a first rolling member; the first rolling member seat is at the first lens, and the first rolling member is rotationally retained between the first rolling member seat and the first sliding rail; the first rolling members of the first counterweight members are spaced from each other;

wherein each of the second counterweight members comprises a second rolling member seat and a second rolling member; the second rolling member seat is at the second lens, and the second rolling member is rotationally retained between the second rolling member seat and the second sliding rail; the second rolling members of the second counterweight members are spaced from each other.

9. The three-dimensional glasses according to claim 8, wherein the first counterweight members are between an outer circumferential surface of the first lens and the inner surface of the first lens frame; and the second counterweight members are between an outer circumferential surface of the second lens and the inner surface of the second lens frame.

10. The three-dimensional glasses according to claim 8, wherein the first rolling member comprises a roll ball, a roller, or a roller pin; and the second rolling member comprises a roll ball, a roller, or a roller pin.

11. The three-dimensional glasses according to claim 8, wherein the first rolling member seat is fixed at the first lens; and the second rolling member seat is fixed at the second lens.

12. A three-dimensional display system, comprising three-dimensional glasses according to claim 8.

* * * * *